(12) United States Patent
Murru

(10) Patent No.: US 9,283,896 B2
(45) Date of Patent: Mar. 15, 2016

(54) VEHICLE PROVIDED WITH A LUGGAGE COMPARTMENT HAVING A HEIGHT-ADJUSTABLE LOADING FLOOR

(71) Applicant: C.R.F. Societa' Consortile per Azioni, Orbassano (IT)

(72) Inventor: Ivan Emanuel Murru, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 0 days.

(21) Appl. No.: 14/066,462

(22) Filed: Oct. 29, 2013

(65) Prior Publication Data

US 2014/0117695 A1    May 1, 2014

(30) Foreign Application Priority Data

Oct. 30, 2012    (EP) .................................... 12425176

(51) Int. Cl.
*B60P 7/08*    (2006.01)
*B60R 5/04*    (2006.01)

(52) U.S. Cl.
CPC .. *B60R 5/045* (2013.01); *B60R 5/04* (2013.01)

(58) Field of Classification Search
CPC .......... B60R 5/04; B60R 5/045; B25B 25/00; B60N 2/242; B60N 2/245; B60N 2/305; B62J 11/00; B63B 25/004; B63B 25/28; B61D 45/001; B61D 45/00; B61D 17/00; B61D 3/16; B61D 3/166; B61D 45/003; B61D 45/002; B65B 17/02

USPC .............. 296/24.44, 65.01, 37.16, 65.09, 69, 296/24.43, 66, 37.316; 297/316; 410/100, 410/118, 97, 117, 129

See application file for complete search history.

(56) References Cited

U.S. PATENT DOCUMENTS

| | | | | | |
|---|---|---|---|---|---|
| 3,393,936 | A | * | 7/1968 | Hall ............................ | 296/24.44 |
| 5,011,208 | A | * | 4/1991 | Lewallen ..................... | 296/37.16 |
| 6,099,222 | A | * | 8/2000 | Moore .......................... | 410/100 |
| 6,439,633 | B2 | * | 8/2002 | Nemoto ...................... | 296/37.14 |
| 7,794,005 | B2 | * | 9/2010 | Storgato et al. ............. | 296/65.01 |
| 7,963,580 | B2 | * | 6/2011 | Plettrichs et al. ........... | 296/37.16 |
| 2009/0167045 | A1 | * | 7/2009 | Storgato et al. ............. | 296/65.01 |

FOREIGN PATENT DOCUMENTS

| | | |
|---|---|---|
| DE | 101 18 680 A1 | 8/2002 |
| DE | 10 2007 035 481 A1 | 1/2009 |
| DE | 10 2010 007 088 A1 | 8/2011 |
| EP | 2 075 153 A1 | 7/2009 |
| GB | 2 320 227 A | 6/1998 |

* cited by examiner

*Primary Examiner* — Jason S Morrow
*Assistant Examiner* — Sunsurraye Westbrook
(74) *Attorney, Agent, or Firm* — Dickstein Shapiro LLP

(57) ABSTRACT

A vehicle has a luggage compartment delimited, at the bottom, by a bottom floor and, at the rear, by a cross-beam defining an entry sill of the luggage compartment. The luggage compartment houses an additional loading floor that can be placed by a user in a lowered position, adjacent to the bottom floor, and in at least one raised position. The vehicle further has a retention member connected to a front end portion of the additional loading floor and to the cross-beam and has two flexible elongated elements connected to a rear end portion of the additional loading floor when the latter is placed in the lowered position.

13 Claims, 4 Drawing Sheets

VEHICLE PROVIDED WITH A LUGGAGE COMPARTMENT HAVING A HEIGHT-ADJUSTABLE LOADING FLOOR

The present invention relates to a vehicle provided with a luggage compartment having a height-adjustable loading floor.

BACKGROUND OF THE INVENTION

As a rule, to secure luggage in a luggage compartment, straps and/or nets are provided, which are placed around the luggage, are hooked to anchorage points arranged in fixed positions on the lateral walls and/or the bottom floor of the luggage compartment, and are at least partly elastic to adapt to the volume to be secured.

In solutions where an additional, height-adjustable loading floor is provided, known retentions systems of the type just described are not normally employed, because they do not adapt to the different height positions at which the additional loading floor can be placed in the luggage compartment.

SUMMARY OF THE INVENTION

Object of the present invention is making a vehicle provided with a luggage compartment having a height-adjustable loading floor that enables the above-described drawback to be overcome in a simple and inexpensive manner and, preferably, allows the luggage to be stowed in a stable manner, whatever the height chosen for the additional loading floor.

According to the present invention, a vehicle is provided as defined in claim 1.

BRIEF DESCRIPTION OF THE DRAWINGS

For a better understanding of the present invention a preferred embodiment will now be described, purely by way of a non-limitative example, with reference to the attached drawings, where.

DETAILED DESCRIPTION OF THE INVENTION

Figure 1:
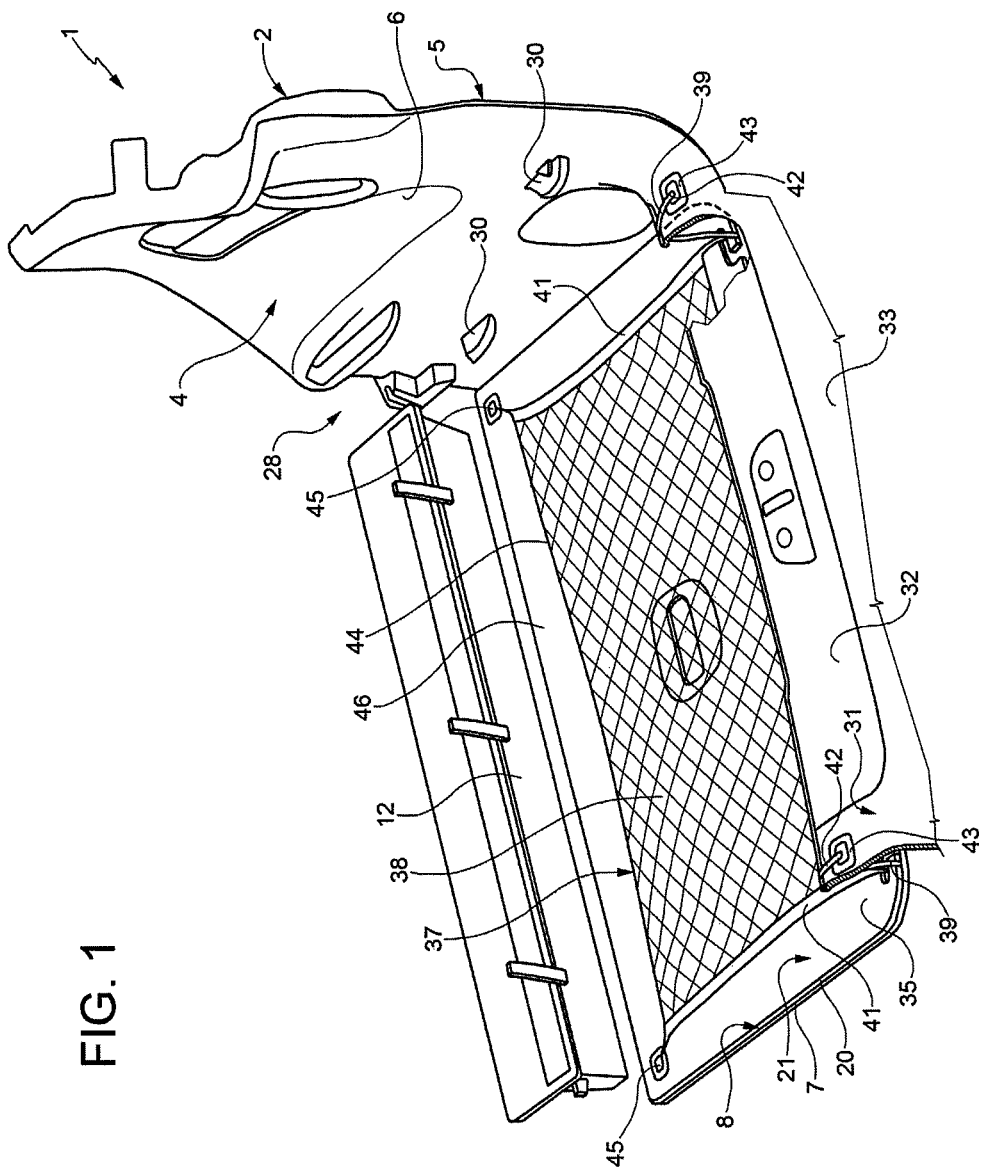
FIG. 1 shows, in perspective and in a simplified manner with parts removed for clarity, a preferred embodiment of the vehicle according to the present invention.

In FIG. 1, reference numeral 1 indicates, as a whole, a vehicle 1 (partially shown) comprising a structure 2 (partially shown) that defines a luggage compartment 4, to which access can be gained through a rear opening 5. In particular, the structure 2 comprises two sides 6, of which only one is shown, and a bottom floor 7 having a substantially horizontal upper surface 8 (FIGS. 2 and 3), upon which luggage can be laid (not shown). According to a variant that is not shown, at least part of the bottom floor 7 can be liftable, like a hatch for example, to provide access to an underlying compartment housing a spare wheel and/or a toolkit for the vehicle, and/or to an empty underlying compartment provided for stowing miscellaneous objects.

The luggage compartment 4 is delimited at the front by a rear seat (not shown). Preferably, a transversal barrier element 12 is placed at the front end of the bottom floor 7, behind a rear seat support, to prevent any objects in the luggage compartment 4 from possible sliding under the rear seat. In particular, the transversal barrier element 12 is connected to the sides 6 in a releasable manner and can be manually removed.

The vehicle 1 also comprises a loading floor 20 with an upper surface 21, on which luggage can be laid, in addition to surface 8.

Figure 2:
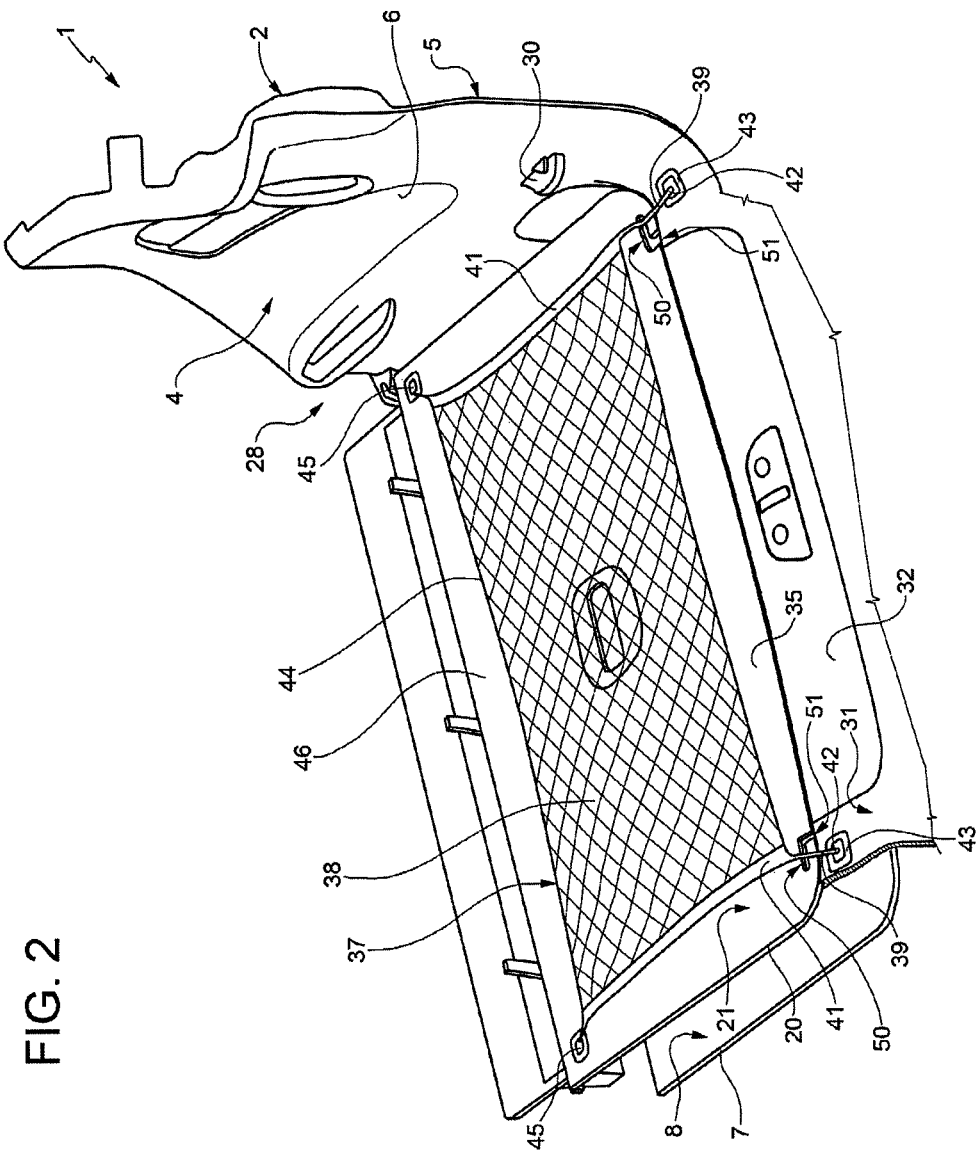
FIGS. 2 and 3 are similar to FIG. 1 and show an additional loading floor of the vehicle placed at different heights with respect to that shown in FIG. 1.
Figure 3:
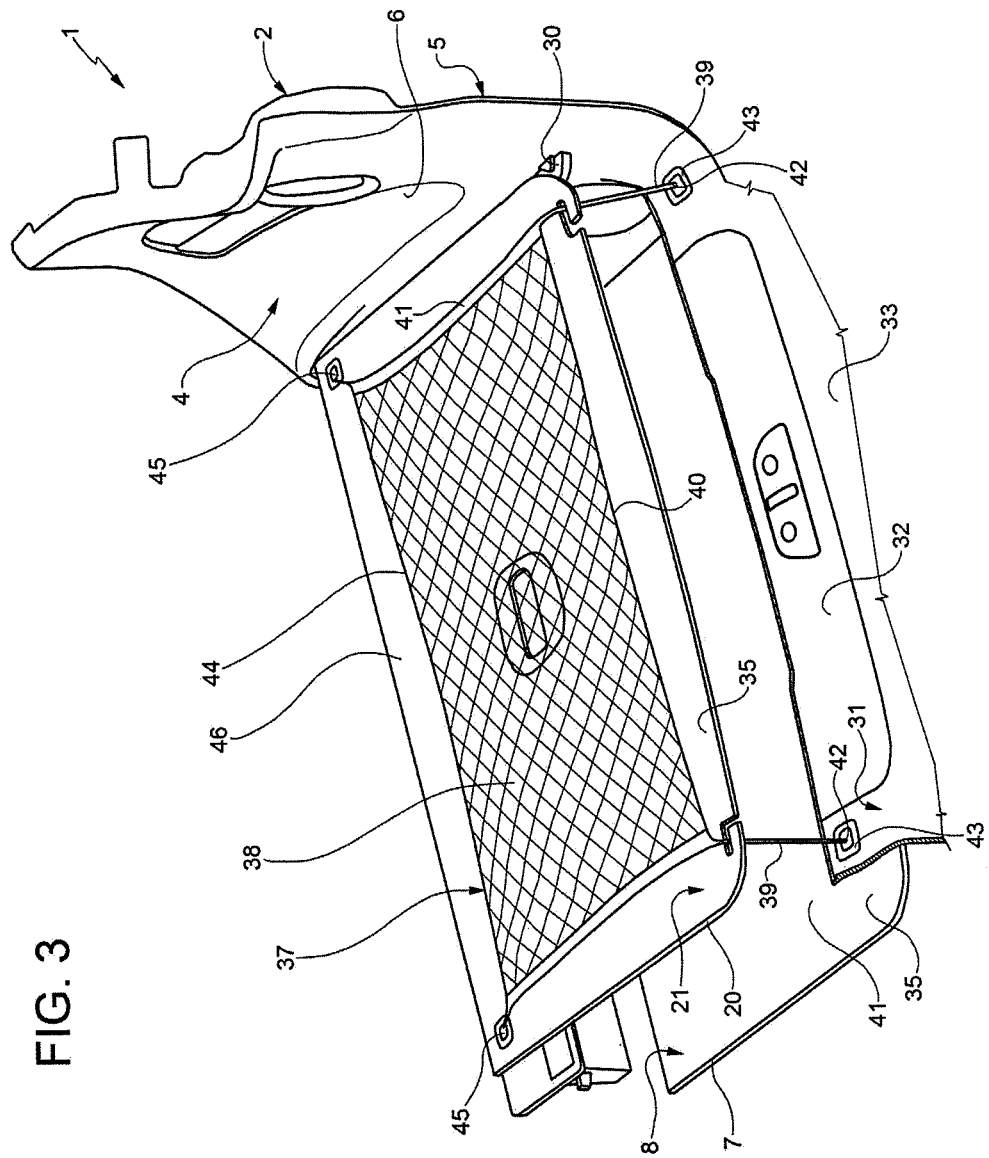

The loading floor 20 is preferably defined by a single panel, has a width substantially equal to that of the luggage compartment 4 and is height-adjustable, in particular to obtain an underlying space 22 above surface 8 (FIGS. 2 and 3).

The loading floor 20 can be manually moved by a user between a lowered position and at least one raised position, with respect to the bottom floor 7. In the lowered position (FIG. 1), the loading floor 20 is positioned just above surface 8, or rests directly on surface 8, and hence the underlying space 22 is absent and it is only possible to lay luggage on surface 21.

In the described particular example, the loading floor 20 can be arranged in two raised positions: in the first one (FIG. 2), the loading floor 20 is placed substantially at the same height of a surface 31 that corresponds to the sill of the rear opening 5. In the example shown, the greater part of surface 31 is defined by a cover 32 in a plastic material, known in the jargon as a "scuff plate", placed over a cross-beam 33, that rearwardly delimits the lower part of the luggage compartment 4 and supports a rear bumper (not shown).

In the second raised position (FIG. 3), the loading floor 20 is positioned above surface 31.

The vehicle 1 comprises a support device 28 to support the loading floor 20 and the luggage, when the loading floor 20 is placed in its raised positions. In particular, the device 28 comprises a front part of surface 31 and a plurality of brackets 30 supported or defined by the sides 6. The brackets 30 are arranged at two different heights and can be selected to support the loading floor 20 in the first or the second raised positions. According to a variant that is not shown, the brackets 30 have a height-adjustable position, along the sides 6, in a manner that is not shown.

In the shown particular example, the loading floor 20 is moved between the various positions by manually extracting a rear portion 35 of the loading floor 20 through the rear opening 5 and repositioning the loading floor 20 in the desired position. According to variants that are not shown, the loading floor 20 is connected to the structure 2 by a device, for example a lever device, which guides and aids movement of the loading floor 20 between the lowered position and a raised position.

According to one aspect of the present invention, the vehicle 1 comprises a deformable member 37, at least part of which is arranged above surface 21 to secure the luggage placed on the loading floor 20.

In particular, the member 37 comprises a net 38 and two elongated elements 39, which are flexible, extend from a rear edge 40 of the net 38, substantially as an extension of the lateral edges 41 of the net 38, and can be defined by cables, tapes, belts, etc. The rear ends 42 of the elongated elements 39 are connected to respective anchorage points 43 mounted in fixed positions on the cross-beam 33, in particular on surface 31. At the same time, the net 38 has a front edge 44, the lateral ends of which are connected to two anchorage points 45 placed in positions set apart on a front end portion 46 of the loading floor 20.

The connection of member 37 to the anchorage points 43 and 45 can be of the fixed or releasable type (for example, using spring catches).

The rear portion 35 is shaped so as to comprise two hook portions 49. Preferably, the hook portions 49 are longitudinally aligned with the anchorage points 43 and define respective passages or eyes 50, through which the elongated elements 39 pass, at least when the loading floor 20 is placed in the lowered position. The passages 50 advantageously have respective openings 51, which are made along the edge of the rear portion 35 and allow the elongated elements 39 to be inserted and extracted by hand.

As can be seen in FIG. 1, when the loading floor 20 is placed in the lowered position, the passages 50 deviate the path of the elongated elements 39 upwards and, at the same time, tend to keep the rear edge 40 in contact with surface 21, in order to secure the luggage on surface 21 in the best possible manner. In particular, starting from the rear edge 40, the elongated elements 39 extend on surface 21 up to the passages 50, where they enter to pass below the loading floor 20. Then, the elongated elements 39 extend beneath the hook portions 49 up to the edge of the rear portion 35. From this edge, the elongated elements 39 extend upwards along the front face of the cross-beam 33 up to surface 31, where they are connected to the anchorage points 43.

When the loading floor 20 is placed at a height equal to at least that of surface 31, the elongated elements 39 can be taken out of the passages 50, thereby leaving the member 37 fastened only by the anchorage points 43 and 45.

As can be seen from comparing the different configurations, the length of the elongated elements 39 is advantageously variable, to adapt them to the height position of the loading floor 25. According to a preferred embodiment, the elongated elements 39 are elastic and hence automatically vary in length depending on the tension to which they are subjected. As an alternative, or in combination with this elasticity, the net 38 could also be elastic to be able to stretch and adapt its length to the height position chosen for the loading floor 20. In addition, according to a variant that is not shown, the elongated elements 39 are provided with adjustment buckles that enable the available length running from the rear edge 40 to be manually adjusted.

Figure 4:
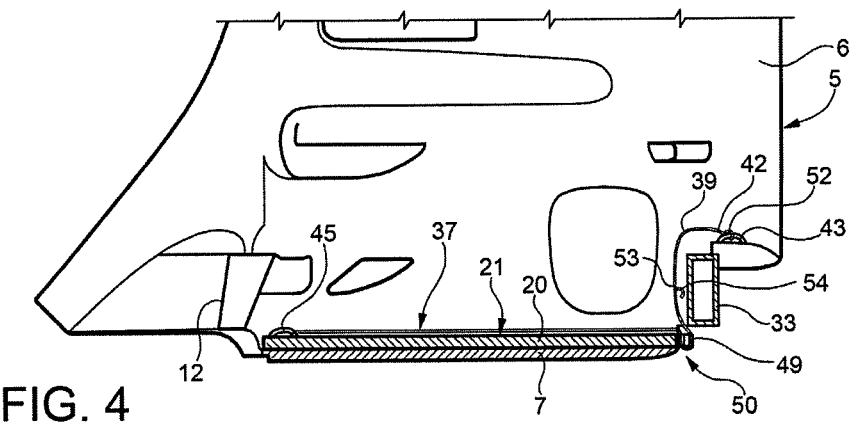
FIGS. 4 to 6 show, schematically and in cross-section, a variant of the present invention.
Figure 5:
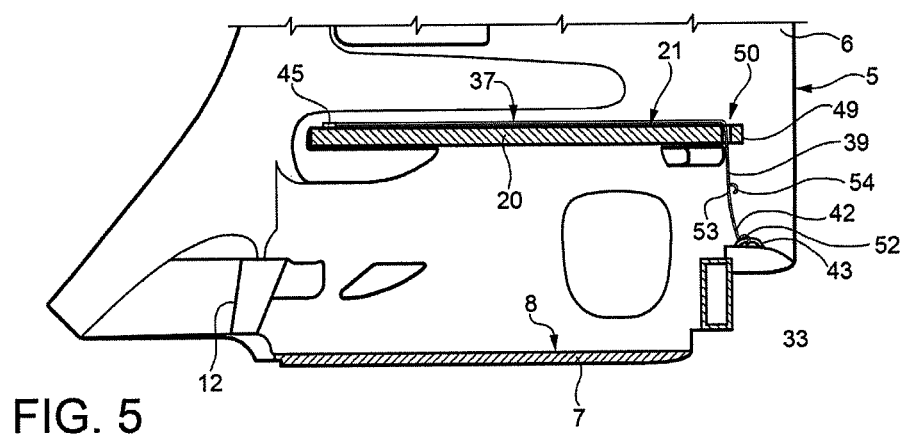
Figure 6:
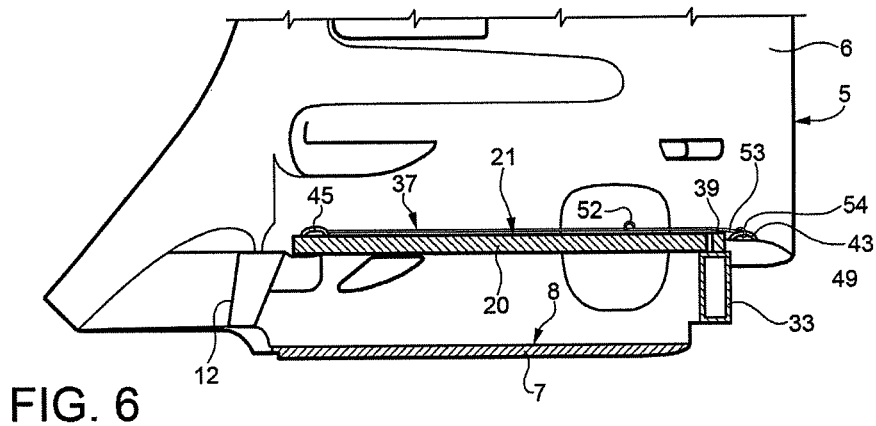

According to a variant schematically shown in FIGS. 4 to 6, the rear ends 42 support respective hook elements 52, which can be connected in a releasable manner to the anchorage points 43 when the loading floor 20 is placed in the lowered position (FIG. 4) and in the second raised position (FIG. 5). Furthermore, the elongated elements 39 comprise respective zones 53, which are in-between the rear ends 42 and the rear edge 40 and support respective hook elements 54, that can be connected in releasable manner to the anchorage points 43 when the loading floor 20 is placed in the first raised position (FIG. 6).

From the foregoing, it is evident how the member 37 is capable to secure the luggage on the surface 21 in an optimal manner, as it always remains with the edges 40 and 44 lying on surface 21 independently of the height position of the loading floor 20. In particular, providing anchorage points on both the cross-beam 33 and the loading floor 20 enables constraining the net 38 to the rear portion 35 when the loading floor 20 is placed below surface 31, or to the cross-beam 33 when the loading floor 20 is placed at a height above or equal to the level of surface 31.

The presence of the elongated elements 39 permits having a relatively simple solution to implement and to connect to the rear portion 35, without changing the intrinsic characteristics of the net 38 with respect to known solutions.

Making the passages 50 directly in the rear portion 35 avoids the connection of additional elements to the loading floor 20, while the presence of the openings 51 enables the elongated elements 39 to be taken out, for example, to easily lay the rear portion 35 on surface 31 without the extra thickness due to the elongated elements 39.

Furthermore, the proposed solution can be implemented by starting from solutions currently on the market and making relatively minor changes.

Finally, it is evident that modifications and variations can be applied to the vehicle 1 described and illustrated herein without leaving the scope of protection of the present invention, as defined in the appended claims.

In particular, the number of anchorage points and/or elongated elements 39 could be different from that indicated by way of example; and/or the net 38 could be replaced by a set of fabric bands or other deformable elements, always having the same function of securing the luggage; and/or the elongated elements 39 could be replaced by elements of different shape and/or structure. In addition, the passages 50 could be defined by rings, hooks or spring catches carried on and coupled to the rear portion 35, instead of being made directly as parts of portion 35; and/or the passages 50 could be without openings 51.

What is claimed is:

1. A vehicle comprising:
   a luggage compartment accessible through a rear opening and delimited, at the bottom, by a bottom floor and, at the rear, by a transversal element defining a sill of said rear opening;
   an additional height-adjustable loading floor, defined by a single panel for supporting luggage, that has an upper surface and is movable in said luggage compartment between a lowered position, adjacent to said bottom floor, and at least one raised position, spaced apart from said bottom floor;
   retention means, separate from the additional loading floor, at least part of which is arranged above and substantially covers said upper surface of said additional loading floor, for securing luggage placed on said additional loading floor;
   anchorage points for connecting said retention means in said luggage compartment;
   wherein said anchorage points comprise:
   a first anchorage point carried by a front end portion of said additional loading floor;
   a second anchorage point carried by said transversal element;
   a third anchorage point carried by a rear end portion of said additional loading floor.

2. The vehicle according to claim 1, wherein said retention means comprise:
   a front end connected to said first anchorage point;
   a rear end connected to said second anchorage point;
   an intermediate portion engaging said third anchorage point at least when said additional loading floor is placed in the lowered position.

3. The vehicle according to claim 2, wherein said intermediate portion is defined by at least two flexible elongated elements having respective rear ends that can be connected to said second anchorage point.

4. The vehicle according to claim 3, wherein said retention means comprise a net; said flexible elongated elements extending from a rear edge of said net.

5. The vehicle according to claim 3, wherein said third anchorage point and said second anchorage point are defined by respective anchorage elements, which are longitudinally aligned with each other.

6. The vehicle according to claim 3, wherein said flexible elongated elements have a variable length.

7. The vehicle according to claim 6, wherein the length of said flexible elongated elements is manually adjustable by means of respective buckles.

8. The vehicle according to claim 6, wherein said flexible elongated elements are elastic.

9. The vehicle according to claim 4, wherein each of the rear ends of said flexible elongated elements support a respective first hook element that can be connected in a releasable manner to said second anchorage point; said flexible elongated elements comprising respective intermediate zones between said rear ends and said rear edge; said intermediate zones each supporting a respective second hook element that can be connected in a releasable manner to said second anchorage point.

10. The vehicle according to claim 3, wherein said third anchorage point is defined by two passages, which are transversally spaced apart and are respectively engaged by said flexible elongated elements.

11. The vehicle according to claim 10, wherein said passages have respective openings that enable the engagement and release of said flexible elongated elements.

12. The vehicle according to claim 1, wherein said third anchorage point is defined by two hook portions, which are transversally spaced apart and form part of said rear end portion.

13. The vehicle according to claim 1, wherein said second anchorage point is arranged on an upper surface of said transversal element.

\* \* \* \* \*